H. V. CORNELL.
SWIVEL JOINT OR COUPLING FOR PIPES.
APPLICATION FILED APR. 30, 1918.
1,302,314.
Patented Apr. 29, 1919.
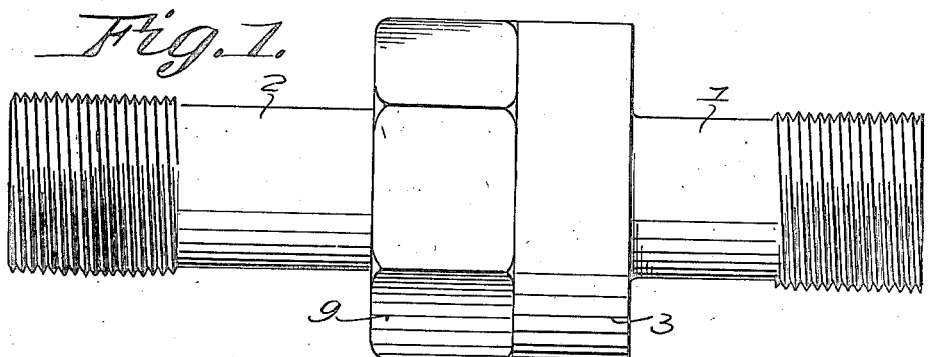
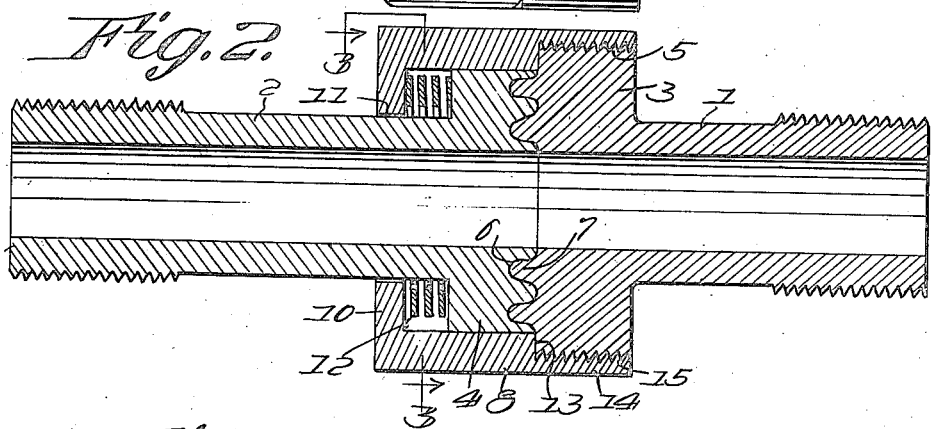
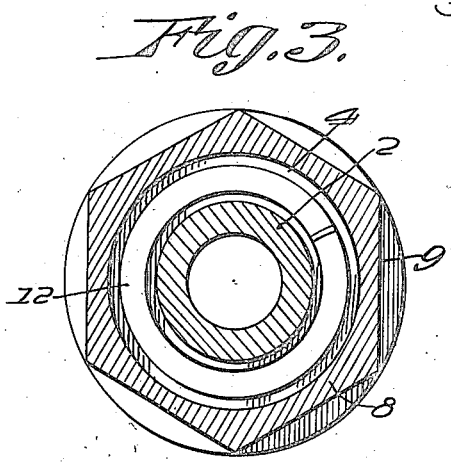
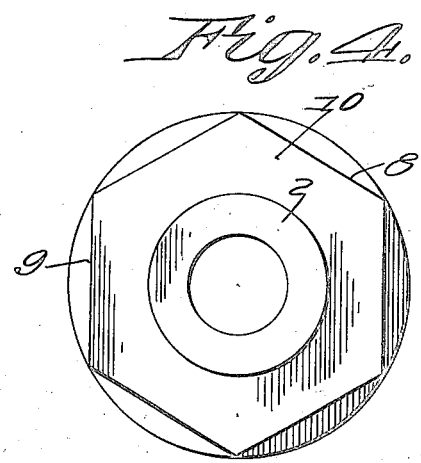
Inventor
Herbert V. Cornell,
By
Attorney

UNITED STATES PATENT OFFICE.

HERBERT V. CORNELL, OF AKRON, OHIO, ASSIGNOR OF ONE-HALF TO CHARLES R. BUTLER, OF AKRON, OHIO.

SWIVEL JOINT OR COUPLING FOR PIPES.

1,302,314.  Specification of Letters Patent.  Patented Apr. 29, 1919.

Application filed April 30, 1918. Serial No. 231,653.

*To all whom it may concern:*

Be it known that I, HERBERT V. CORNELL, a citizen of the United States of America, residing at Akron, in the county of Summit and State of Ohio, have invented new and useful Improvements in Swivel Joints or Couplings for Pipes, of which the following is a specification.

The present invention comprehends improvements in pipe couplings and more particularly relates to a swivel joint or coupling for pipes.

It is the primary aim and object of the present invention to provide a device of the above mentioned character designed for operably connecting two pipe sections together in such a manner that one of the sections may rotate with respect to the other without causing any leakage between the joint, the arrangement being particularly adapted to be used in connecting steam pipes employed in hydraulic press work, etc.

More particularly the present invention contemplates the provision of a device of the above mentioned character wherein the adjacent ends of the pipe sections are designed for snug engagement with respect to each other and at the same time capable of being partly rotated relatively to each other and improved resilient clamping means acting in conjunction therewith to hold the adjacent ends of the sections in close relation with respect to each other so as to prevent leakage of steam or other fuel or liquid which is conducted through the pipe section.

It is a more specific object of the present invention to provide a device of the above mentioned character wherein improved means is employed for attachably connecting the ends of the pipe section together such means being incidentally designed to act on the resilient means to bear the tension thereof.

Among the other aims and objects of this invention may be recited the provision of a device of the character described with a view to compactness, and in which the number of parts are few, the construction simple and the cost of production low and the efficiency high.

Other improvements and novel details in the construction and arrangement of the various parts of the apparatus will be brought out more in detail in the description to follow, which for a clear understanding of the invention should be considered in connection with the accompanying drawings forming a part hereof and wherein is disclosed for the purpose of illustration a convenient and satisfactory embodiment of the invention. It is to be noted in this connection that minor changes may be made without departing from the principle of operation of the various parts.

The invention is clearly illustrated in the accompanying drawings, in which:

Figure 1 is a side elevation of the complete device.

Fig. 2 is a longitudinal sectional view thereof.

Fig 3 is a transverse section taken on line 3—3 of Fig. 2 in the direction in which the arrows point, and Fig. 4 is an end elevation of the device with one of the pipe sections removed.

Similar characters of reference are employed in all of the above described views to indicate corresponding parts.

Referring now, more particularly, to the accompanying drawings there is provided a pair of pipe sections 1 and 2 on the adjacent ends of which are formed annular flanges 3 and 4 both of which in effect constitute heads. The head 4 on section 2 is slightly smaller in diameter than the head 3 on section 1 while the latter head is provided on its outer periphery with screw threads 5 for a purpose that will hereinafter become apparent. The adjacent faces of the heads are formed with a concentric series of annular grooves 6 which are complemental, while provided between the adjacent grooves on each flange or head are annular ribs 7. These ribs have their outer edges curved transversely while the bottoms of the grooves are likewise curved transversely to conform thereto to consequently permit of the snug arrangement of the ribs 7 on one flange or head within the grooves of the adjacent flange or head as indicated in Fig. 2. Of course by this construction it is also apparent that the section 2 may rotate relative to the section 1. In order to yieldingly hold the flanges or the heads 3 and 4 in snug engagement with each other a sleeve 8 is employed the outer surface thereof being constructed in a hexagonal form as at 9 to facilitate the reception of a wrench or other tool thereon. An inwardly extending annular flange 10 projects from one end of the sleeve while the inner edge 11 of the flange is arranged in close substantial relation about the outer edge of the pipe section 2 in the rear of the head 4 positioned between the flange 10 and the head 4. A suitable resilient means in the present instance consists of a series of coil expansion springs 12, the respective ends of which bear against the inner surface of the flange and the rear surface of the head 4. The inner surface of the sleeve is reduced near its opposite edge to form an annular shoulder 13 while the reduced portion 14 is formed with internal threads 15 for attachable engagement with threads 5 on the flange or head 3 while the shoulder is at times designed to abut the outer face of the flange or head 3. By this arrangement it is apparent that when the sleeve is engaged on the flange or head 3 the springs 12 will be held in position and will exert their tension on the head 4 to yieldingly hold the latter in engagement with the head 3. The tension of the spring of course may be varied by adjusting the sleeve 8 on the head 3 as is apparent. The outer portions of the pipe sections 1 and 2 are formed with exterior screw threads 16 to facilitate connection with the adjacent sections of the main pipe supply (not shown).

In use, assuming that the parts have been assembled in the manner described and as indicated in the drawings, it is to be understood by the provision of the flanges or heads 3 which are provided with the inner engagable grooves 6 and ribs 7 that the pipe section 2 may rotate with respect to the pipe section 1 yet at the same time they are held in substantially close relation with each other by the spring 12 so as to prevent any leakage at the joint. Of course the tension of the springs may be varied by adjusting the sleeve on the flange or head 3.

It is believed in view of the foregoing description that a further detailed description of the operation of the invention is entirely unnecessary. Likewise it is believed that the advantages of the invention will be readily apparent.

As many changes could be made in the above construction and many apparently widely different embodiments of this invention could be made without departing from the scope thereof it is intended that all matter contained in the above description or shown in the accompanying drawings shall be interpreted as illustrative and not in a limited sense. It is also to be understood that the language used in the following claim is intended to cover all the generic and specific features of the invention herein described and all statements of the scope of the invention which as a matter of language might be said to fall therebetween.

Having thus fully described the invention what is claimed and desired to be secured by Letters Patent is:

A device of the character described including a pair of pipe sections, annular flange-like heads formed on the adjacent ends of the sections, one of the heads being smaller in diameter than the other, the large head being formed with exterior screw threads, the adjacent faces of both of the heads being formed with concentric series of grooves which are complemental to each other, concentrically arranged annular ribs provided between the grooves and designed for sliding and rotary engagement with the grooves in the adjacent head, the grooves being of a depth equal to the height of the ribs, a sleeve arranged about the heads, an inwardly extending flange formed on one end of the sleeve, the sleeve being reduced on its inner surface near its opposite end to form an annular shoulder and the reduced portion being provided with threads for detachable engagement with the threads on the large head, the small head being arranged in close relation with the inner surface of the sleeve, and an expansion coil spring disposed about one of the pipe sections within the sleeve and having its respective ends bearing against the small head and the flange on the sleeve and exerting its tension to normally hold grooves in engagement with the ribs yet permitting of a relative sliding and rotary movement between the heads.

In testimony whereof I affix my signature.

HERBERT V. CORNELL.